March 17, 1925.                                                1,529,951
H. HORT
SCALE FOR TESTING THE POSITION OF THE CENTER OF GRAVITY OF RAPIDLY
ROTATING PARTS OF MACHINERY
Filed Jan. 2, 1923
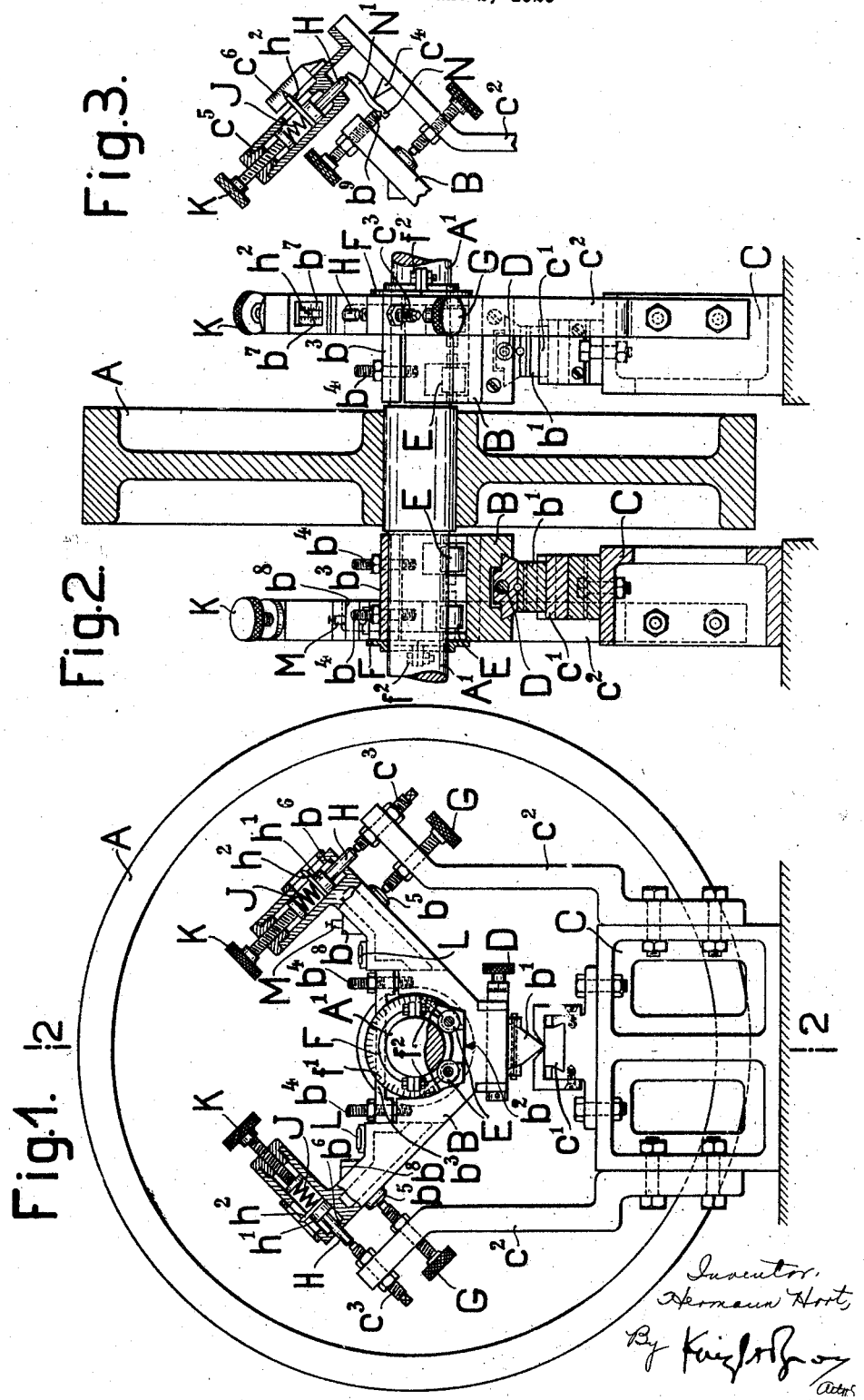

Patented Mar. 17, 1925.

1,529,951

UNITED STATES PATENT OFFICE.

HERMANN HORT, OF ESSEN, GERMANY, ASSIGNOR TO FRIED. KRUPP AKTIEN-GESELLSCHAFT, OF ESSEN-ON-THE-RUHR, GERMANY.

SCALE FOR TESTING THE POSITION OF THE CENTER OF GRAVITY OF RAPIDLY-ROTATING PARTS OF MACHINERY.

Application filed January 2, 1923. Serial No. 610,287.

*To all whom it may concern:*

Be it known that I, HERMANN HORT, residing at Essen, Germany, a citizen of the German Republic, have invented a certain new and useful Improvement in Scales for Testing the Position of the Center of Gravity of Rapidly-Rotating Parts of Machinery, of which the following is a specification.

This invention relates to scales for testing the position of the center of gravity of rapidly rotating parts of machinery and has for its object to provide a knife-edge scale which is, more particularly, adapted for testing parts of machinery of the kind which are fastened to a shaft projecting by a considerable amount beyond the hub of the respective part at both sides thereof.

In the drawing:

Fig. 1 is a front elevation, partly in section, of an embodiment of the subject matter of the invention, Fig. 2 is a section on the line 2—2 of Fig. 1, seen from the left, and Fig. 3 is a view, similar to Fig. 1, of a modified form of a detail.

A designates the part of machinery to be tested and $A^1$ the shaft on which the part of machinery is fastened and which projects by a considerable length beyond the hub of the part at both sides of the same. B are two bearing bodies which form each a separate structure and in which the shaft $A^1$ is mounted for rotation at both sides of the hub of the machinery part A. Each bearing body B is provided with a knife-edge $b^1$ which extends in the direction of the axis of the bearing and by means of which the body B is liftably mounted on a seat $c^1$ carried by a stand C. The knife-edges $b^1$ are adjustable with relation to the bearing bodies B by means of a set-screw D in a direction transversely to the line along which the knife-edges rest on their seats.

In order to allow the machinery part A to rotate easily in the bearing bodies B, same are provided each with two rollers E mounted for rotation on fixed shafts and supporting the shaft $A^1$. The rollers E are arranged at a considerable height above the knife-edges $b^1$, so that, under the action of the gravity, the bearing bodies B along with the machinery part A may only take a position of unstable equilibrium on the two knife edge bearings $b^1$, $c^1$. Each outer head face of the bearing bodies B is provided with a reading mark $b^2$ (Fig. 1) and a circular graduation $f^1$ which serve to determine the different angular positions into which the machinery part A may be turned on the bearing rollers E. The circular graduations $f^1$ are formed on a bipartite ring F each adapted to be clamped to the shaft $A^1$ by means of screws $f^2$. Each bearing body B is further provided with a cap $b^3$ adapted to bear on the shaft $A^1$ and to be so tightly clamped to the latter by means of bolts $b^4$ that the shaft $A^1$ will be securely held against any rotation on the rollers E in every angular position.

Attached to the stands C at both sides of the shaft $A^1$ are brackets $c^2$ which are provided with set-screws G on which the bearing bodies B are adapted to bear by means of bearing faces $b^5$ (Fig. 1). The brackets $c^2$ further carry adjustable screws $c^3$ against each of which bears a bolt H which is placed under the pressure of a spring J (Fig. 1) and guided in the bearing bodies B. Every bolt H possesses a head $h^1$ which serves as a support for one end of the corresponding spring J and by means of which the bolt may abut against a stop-face $b^6$ (Fig. 1) of the bearing body B under the pressure of the spring, said stop-face determining the front limit position of the bolt H. The other ends of the springs J which are all of the same strength, bear against set-screws K by means of which they may be put under a preliminary tension in such a manner that they will exert equal forces on the bolts H when these are in their front limit position. Every bolt H carries a pointer $h^2$ indicating in every position of the bolt H at a double graduation $b^7$ (Fig. 2) the force at which the corresponding spring J is acting on the bolt.

Moreover, every bearing possesses at both sides of a middle plane extending through the bearing edge of the knife-edge $b^1$ and the axis of rotation of the shaft $A^1$, a tubular water level L (Fig. 1) the air bubble of which balances when the middle plane of the bearing body B is in a vertical position. In this vertical position of the middle plane, the axes of each set-screw $c^3$ and corresponding bolt H will constitute a straight line, all of these straight lines lying symmetrically with relation to the middle plane. Finally, every bearing body B is provided at both sides of its middle plane with a supporting face $b^8$ for receiving weights M.

In order to test the position of the center of gravity of the machinery part A same is first suspended above the stands C by means of a crane. After removing the caps $b^3$, the bearing bodies B are fitted by means of their rollers E to the shaft $A^1$ at both sides of the machinery part, whereupon the bearing bodies are rotatably suspended from the shaft $A^1$ by placing the caps $b^3$ on the shaft and fastening them again to the bearing bodies by means of the bolts $b^4$. Besides, the bipartite rings F are fastened to the shaft $A^1$ in any angular position at both sides of the bearing bodies B closely beside the same. After the bearing bodies B have been turned on the shaft $A^1$ into an angular position in which the air bubbles of the water levels L will balance, the caps $b^3$ are tightened by means of the bolts $b^4$ to such a degree that the bearing bodies and the machinery part are secured against relative rotation. The bearing bodies B along with the machinery part A are now cautiously lowered with the knife-edges $b^1$ onto the seats $c^1$ and propped by the set-screws G in such a manner as to cause the air bubbles of the water levels L to continue balancing. Moreover, the bolts H are adjusted by means of the set-screws $c^3$ serving as abutments for the same, so that the pointers $h^2$ will point at the same division mark of the graduations $b^7$. The springs J which have been previously put under the same preliminary tension by means of the set-screws K, will then exert forces of equal strength on the bolts H, so that the propping forces which are exerted on each bearing body B by the set-screws $c^5$ which serve as abutments for the bolts H, are in equilibrium at the bearing body B with relation to the axis of the knife-edge bearing $b^1$, $c^1$. Therefore, if the center of gravity of the machinery part A to be tested lies in the axis of rotation, the bearing bodies B will remain in their condition of equilibrium indicated by the water levels L when the set-screws G are screwed backwards and thus withdrawn from the bearing faces $b^5$ of the bearing bodies B. If, however, the center of gravity lies at a distance from the axis of rotation, as will be generally the case and as it is assumed for the first, the bearing bodies B will, if the center of gravity lies for instance on the left side, incline towards the left upon unscrewing the set-screws G, this being immediately indicated by the water levels L.

In this case, the bearing bodies are first readjusted by means of the set-screws G in such a manner that the air bubbles of the water levels L will balance; after loosening the caps $b^3$, the machinery part A is turned with relation to the bearing bodies B by a certain amount, whereupon the bearing caps $b^3$ are again tightened. The set-screws G are then unscrewed again and it is watched whether the air bubbles of the water levels will again indicate a deflection. If this occurs the described operation will be repeated until the machinery part during its adjustment with relation to the bearing bodies B, will come into an angular position in which its center of gravity lies in the middle plane of the bearing bodies B, which plane extends through the axis of rotation of the machinery part and the bearing edges of the knife-edges $b^1$. In this case, the bearing bodies B will remain in their position of equilibrium upon unscrewing the set-screws G, so that the air bubbles of the water levels L will not change their position. The bearing bodies B are then fixed again by means of the screws G and the machinery part A rotated with relation to the bearing bodies by exactly 90°, which can be read by means of one of the two marks $b^2$ at the corresponding graduation $f^1$, whereupon the machinery part is again securely clamped to the bearings B by tightening the caps $b^3$. The machinery part A possesses now a high overweight on one side, for the equalization of which the tension of the springs J situated on the heavy side of the machinery part is increased by a corresponding amount through the intermediary of the set-screws $c^3$ so that, upon unscrewing the set-screws G, the air bubbles of the water levels L will balance. The difference between the number indicated by the pointers $h^2$ at the graduations $b^7$ on the heavy side of the machinery part and the number to be read at the graduations $b^7$ on the other side will then constitute a measure for the mass that has to be removed from the heavy side of the machinery part in order to displace the center of gravity into the axis of rotation. After this mass has been removed, the springs J are again adjusted in such a manner as to cause the pointers $h^2$ to indicate equal numbers at the graduations $b^7$ both at the right and at the left side. The air bubbles of the water levels L are thus caused to balance when the set-screws G have been unscrewed, indicating thereby that the center of gravity is now situated in the axis of rotation.

Instead of putting the springs J under a higher tension on the heavy side of the machinery part for the purpose of determining the mass to be removed from that side, as described, weights M of suitable size may be placed on the faces $b^8$ of the opposite side.

The working with the described knife-edge scale will be considerably facilitated when choosing conditions of the kind under which the bearing bodies B together with the machinery part A will always be returned into their position of equilibrium under the action of the springs J, when they are resting so as to be freely movable in their position of equilibrium on the knife-edge bearings $b^1$, $c^1$ and artificially moved from that position into another one by a force acting only transitorily. Such a stable condition of equilibrium produced by the action of the springs J may, at a given strength of the springs J, be attained by making the distance between the springs and the axis of the knife-edge bearings so large as to exceed a certain limit value determined by the conditions of equilibrium. Also in case a stable condition of equilibrium is produced in the way indicated, it will be possible to obtain by the use of sufficiently weak springs J a scale which is always sufficiently sensible for determining the smallest distances of the centers of gravity.

In some cases, the limit value which the distance of the springs J from the axis of the knife-edge bearings has to exceed, becomes inconveniently large. A stable condition of equilibrium may then be attained by interposing between the bearing bodies B and the brackets $c^2$ a double-armed lever each of a sufficiently large ratio of transmission, such as shown f. i. by Fig. 3. In this figure, N denotes the short and $N^1$ the long arm of the lever which is mounted on a knife-edge $c^4$ of the corresponding bracket $c^2$. The bearing body B bears on the short lever arm N through the intermediary of a set-screw $b^9$ which corresponds to the set-screw $c^3$. The bolt H with the pointer $h^2$, the spring J and the set-screw K are, in this case, not arranged on the bearing body B but on the bracket $c^2$ in a casing $c^5$ fastened to the same, this casing being provided with a graduation $c^6$ corresponding to the graduation $b^7$ and co-operating with the pointer $h^2$. The bolt H, which bears on the long lever arm $N^1$ will transmit the power of the springs J to the bearing body B in such a manner that the effect of the spring will be increased in accordance with the ratio of transmission of the lever N, $N^1$. As regards the spring action, the arrangement according to Fig. 3 is therefore equal to an arrangement according to Figs. 1 and 2 with which the distance between the springs J and the axis of the knife-edge bearings is increased in a proportion equal to the ratio of transmission of the lever N, $N^1$, and it is therefore adapted for use in cases in which, with the arrangement according to Figs. 1 and 2, the requisite distance between the springs J and the axis of the knife-edge bearings would become too large.

Without departing from the spirit of the invention, the caps $b^3$ and bolts $b^4$ may be dispensed with. In this case, prior to the lowering of the machinery part A onto the scale, the bearing bodies B resting on the seats $c^1$ are adjusted in such a manner as to cause the air bubbles of the water levels to balance, whereupon the machinery part A together with the shaft $A^1$ is placed on the rollers E.

Claims:

1. A knife-edge scale for testing the position of the center of gravity of a rotary machine part, said part being mounted on a relatively fixed shaft, comprising a scale stand, a plurality of bearing bodies, aligned knife-edge bearings between said bearing bodies and said stand whereby said bearing bodies are supported on said stand, said shaft being supported in said bearing bodies above and parallel to said knife bearings, and resilient propping members interposed between said bearing bodies and said stand, said propping members acting on said bearing bodies in planes removed from said knife-edge bearings, the strength of said propping members being so small as to allow of an accurate static testing operation.

2. A knife-edge scale for testing the position of the center of gravity of a rotary machine part, said part being mounted on a relatively fixed shaft, comprising a scale stand, a plurality of bearing bodies, aligned knife-edge bearings between said bearing bodies and said stand whereby said bearing bodies are supported on said stand, said shaft being supported in said bearing bodies above and parallel to said knife bearings, resilient propping members interposed between said bearing bodies and said stand, said propping members acting on said bearing bodies in planes removed from said knife-edge bearings, the strength of said propping members being so small as to allow of an accurate static testing operation, and means for adjusting said propping members for compensating the unbalancing force when said machine part is not in equilibrium.

3. A knife-edge scale for testing the position of the center of gravity of a rotary machine part, said part being mounted on a relatively fixed shaft, comprising a scale stand, a plurality of independent bearing bodies, aligned knife-edge bearings between said bearing bodies and said stand whereby said bearing bodies are supported on said stand, said shaft being supported in said bearing bodies above and parallel to said knife bearings, resilient propping members interposed between said bearing bodies and said stand, said propping members acting on said bearing bodies in planes removed from said knife-edge bearings, the strength of said propping members being so small as to allow of an accurate static testing operation, and means on each of said bearing bodies for indicating the state of compression of said propping members.

4. A knife-edge scale for testing the position of the center of gravity of a rotary machine part, said part being mounted on a relatively fixed shaft, comprising a scale stand, a plurality of bearing bodies, aligned knife-edge bearings between said bearing bodies and said stand whereby said bearing bodies are supported on said stand, said shaft being supported in said bearing bodies above and parallel to said knife bearings, resilient propping members interposed between said bearing bodies and said stand, said propping members acting on said bearing bodies in planes removed from said knife-edge bearings, the strength of said propping members being so small as to allow of an accurate static testing operation, means for adjusting said propping members for compensating the unbalancing force when said machine part is not in equilibrium, and indicating means operated by said resilient propping members for measuring the unbalancing force.

5. A knife-edge scale for testing the position of the center of gravity of a rotary machine part, said part being mounted on a relatively fixed shaft, comprising a scale stand, a plurality of bearing bodies, aligned knife-edge bearings between said bearing bodies and said stand whereby said bearing bodies are supported on said stand, said shaft being supported in said bearing bodies above and parallel to said knife bearings, means for resiliently propping said bearing bodies, and reduction means between said bearing bodies and said resilient propping means for stepping-down the action of the unbalancing force when said machine part is not in equilibrium.

6. A knife-edge scale for testing the position of the center of gravity of a rotary machine part, said part being mounted on a relatively fixed shaft, comprising a scale stand, a plurality of bearing bodies, aligned knife-edge bearings between said bearing bodies and said stand whereby said bearing bodies are supported on said stand, said shaft being supported in said bearing bodies above and parallel to said knife bearings, means for resiliently propping said bearing bodies, and unequal-arm levers interposed between the bearing bodies and said propping means, the long arms of said levers being engaged by said propping means.

7. A knife-edge scale for testing the position of the center of gravity of a rotary machine part, said part being mounted on a relatively fixed shaft, comprising a scale stand, a plurality of bearing bodies, aligned knife-edge bearings between said bearing bodies and said stand whereby said bearing bodies are supported on said stand, said shaft being supported in said bearing bodies above and parallel to said knife bearings, means for resiliently propping said bearing bodies, liquid levels carried by said bearing bodies, and set-screws arranged between said bearing bodies and said scale stand for adjusting said liquid levels.

8. A knife-edge scale for testing the position of the center of gravity of a rotary machine part, said part being mounted on a relatively fixed shaft, comprising a scale stand, a plurality of bearing bodies, aligned knife-edge bearings between said bearing bodies and said stand whereby said bearing bodies are supported on said stand, said shaft being supported in said bearing bodies above and parallel to said knife bearings, means for resiliently propping said bearing bodies, and faces on said bearing bodies for receiving balancing weights.

The foregoing specification signed at Cologne, Germany, this 8th day of December, 1922.

HERMANN HORT.